United States Patent [19]

Purnell-Ayres

[11] Patent Number: 4,784,433
[45] Date of Patent: Nov. 15, 1988

[54] PORTABLE SUNSHADE FOR INFANTS IN VEHICLES

[76] Inventor: Lorraine Purnell-Ayres, Rte. 1, Box 56, Snow Hill, Md. 21863

[21] Appl. No.: 154,204

[22] Filed: Feb. 10, 1988

[51] Int. Cl.⁴ .................................................. A47C 7/10
[52] U.S. Cl. ................................. 297/184; 135/19.5; 160/20
[58] Field of Search ................. 297/184; 135/19.5, 89, 135/90; 160/19, 20, 22, 57, 58, 370.2

[56] References Cited

U.S. PATENT DOCUMENTS

| | | | |
|---|---|---|---|
| 2,583,824 | 1/1952 | Dwinell et al. | 160/20 |
| 3,042,054 | 7/1962 | Coberly, Jr. | 135/19.5 |
| 4,314,727 | 2/1982 | Potts | 297/184 |
| 4,579,385 | 4/1986 | Koenig | 297/184 |
| 4,583,779 | 4/1986 | Myers | 297/184 |
| 4,583,780 | 4/1986 | Finn | 297/184 |
| 4,671,334 | 6/1987 | Yadegar et al. | 160/370.2 |
| 4,733,906 | 3/1988 | Davis et al. | 297/184 |

*Primary Examiner*—James T. McCall
*Attorney, Agent, or Firm*—Walter G. Finch

[57] ABSTRACT

An infant-protecting sunshade for use in a land vehicle such as an automobile with an infant car set or a stroller. The sunshade is a unitary member stamped in the shape of a flat mushroom from flat sheet rubber and bent at fold lines to form a hood having a back insertable for support behind an infant car seat, a forwardly foldable top, and first and second downward sides, foldable up and securable by hook and loop fastening over the top when not in use. Being flexible, either or both sides can, in tight quarters, be rolled up to pass an obstruction such as the inside wall of an automobile.

6 Claims, 2 Drawing Sheets

PORTABLE SUNSHADE FOR INFANTS IN VEHICLES

FIELD OF THE INVENTION

This invention relates generally to shelters and specifically to a sunshade for infants in vehicles.

BACKGROUND OF THE INVENTION

Infants cannot by themselves escape dangerous overheating by rays of the sun that pass into motor vehicles. The same can apply to strollers in which infants are transported. Sunshades have been provided to prevent this, but in many cases have been complex, expensive, difficult or damaging to the vehicle to install, slow to adjust, and in some cases have had mechanisms dangerous to infants.

Among known devices are those disclosed in the following U.S. patents:

U.S. Pat. No. 4,583,780 granted to C. B. Finn on 4-22-86 showed a tinted-plastic pivotal arc-shaped screen that fastens on an infant car seat;

U.S. Pat. No. 4,579,385 granted to C. L. Koenig on 4-1-86 showed a sunshade that fastens on a car seat and has a "Velcro" fastening;

U.S. Pat. No. 4,314,727 granted to J. H. Potts on 2-9-82 showed a shield for a car seat that can attach by loop and pile fasteners;

U.S. Pat. No. 4,583,779 granted to P. A. Myers on 4-22-86 showed a sunshade that fastens to a car seat and that has side flaps that can be pivoted.

SUMMARY OF THE INVENTION

However, no sunshade for infants is known to provide the combination of advantages of this invention according to the objects below, which advantages are intended to make it the standard of commerce for the purpose intended.

Further objects are to provide a sunshade as described that is safe and efficient, has no sharp corners or harsh structures that can injure a child in an accident as in gusty wind but on the contrary will protect a child from impact; is reliable, durable, lightweight, compact and quickly and easily installed without need for dangerous belts, strings, or latches; is attractive in appearance and versatile in operation.

BRIEF DESCRIPTION OF THE DRAWINGS

The above and other objects and advantages of the invention will become more readily apparent on examination of the following description, including the drawings in which like reference numerals refer to like parts.

DETAILED DESCRIPTION

Figure 1:
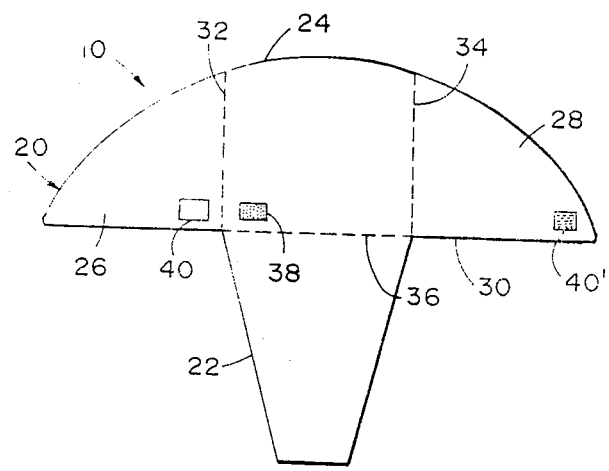
FIG. 1 is a plan view of a preferred embodiment of the invention as formed from a sheet of material.

FIG. 1 shows the invention in embodiment 10, a unitary sunshade for infants in car seats of motor vehicles and the like, strollers being also an application.

The invention is made of sheet material, being cut from a flat sheet of rubber or the like flexible material. In plan view as shown it has the outline preferably of a flattened, symmetrical mushroom 20 with anchor or stem 22 and arcuate cap or top 24 with overhanging wings or side portions 26, 28, also part of the arc shape at the upper edge but with straight lower edges 30. Fold lines 32, 34, 36 respectively provide for the top shield or top 24 to fold at right angles to the stem 22 thus forming, from the central portion 24 of the top, a roof for the unit when in use, and for the side portions 26, 28 to fold down from the central portion 24 and support it while at the same time forming pivotal side curtains or shields against low lateral beams of sunlight. The next figure explains elements 38, 40, and 40'.

Figure 2:
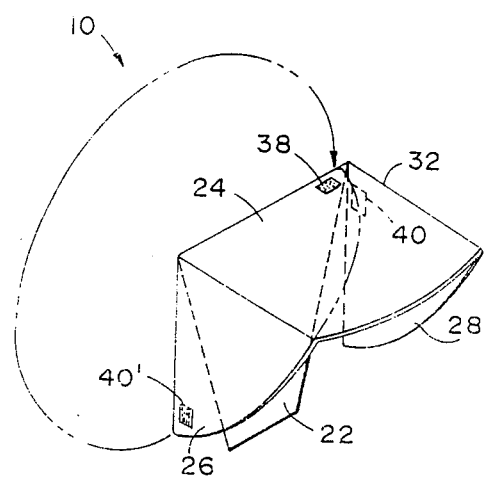
FIG. 2 is a perspective view thereof in use-position.

FIG. 2 shows embodiment 10 folded in use-position. The stem 22 is preferably tapered, smaller end down, for easy insertion between the back of an infant car seat and seatback of a motor vehicle where it holds securely upright. The central portion of the top 24 may be substantially as broad as long. The side portions 26, 28 may be about as long as the width of the central portion 24 of the top and, as noted, may act as braces holding the top central portion nearly horizontal when against the vehicle seatback. Either or both of the side portions 26, 28 may fold over the top central portion 24, one over the other for example, and the top central portion may be supported by an infant car seat upper part, if desired. To maintain the folded position, the top center portion 24 may have a piece of hook and loop fabric 38 such as "Velcro" brand fabric bonded to it on the upper side adjacent the fold line 32, and the adjacent side 28 may have an opening 40 in it providing clearance to the fabric 38 for joining through the hole by a complementary piece of hook and loop fabric 40' on the lower face of the other side 26 when folded. Result: the shade 10 may hold the sides compactly in folded position for ventilation or carriage or other purposes.

Figure 3:
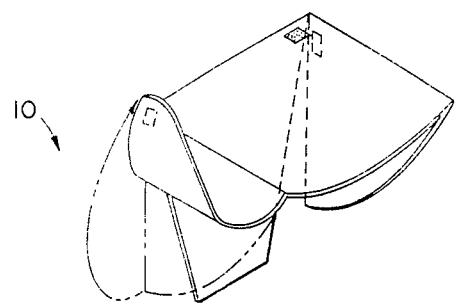
FIG. 3 is a perspective view thereof with environment of use indicated.
Figure 4:
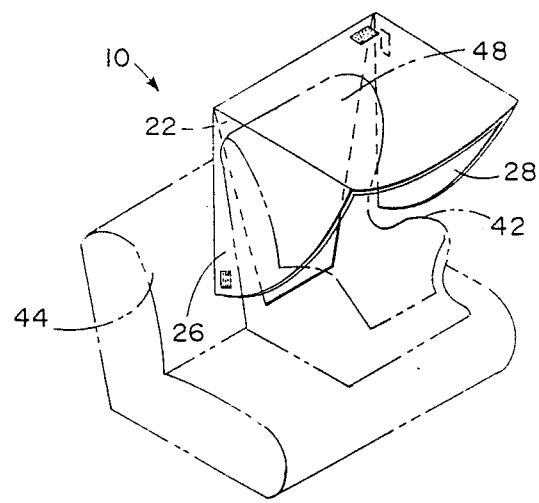
FIG. 4 is a perspective view showing folding in portions.

FIGS. 3 and 4 show how the embodiment 10 is deployed. In use with a typical infant car seat 42 (FIG. 4) it is easily maintained. Sunlight entering from the back direction is shielded by the stem 22, which also serves to hold the system 10 upright by insertion of the stem 22 between the vehicle seatback 44 and the back 48 of the infant car seat, both conventional. Either side 26, 28 of the shade 10 can be folded up easily, either hinged about the fold line or, when close to the side of a vehicle, rolled. Being of rubber (no thicker than about ⅛ inch (3 mm) is necessary) the sides 26, 28 can be rolled up and then will lie flat on the top.

Figure 5:
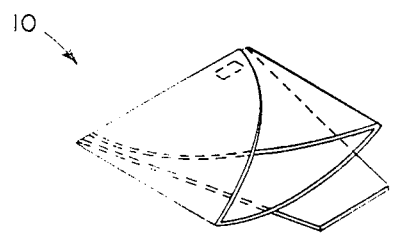
FIG. 5 is a perspective view showing folding mode.

FIG. 5 shows the compact folding mode of the embodiment 10, for carriage.

The installation and adjustment take but a moment, as does removal.

Dimensions of a successful working model made of paperboard have been found to be, when laid out flat: about 32 inches (0.8 m) high, about 49 inches (1.2 m) wide, the top portion being about 17 inches (0.4 m) wide and 15 inches (0.38 m) wide; the stem is about 18 inches (0.45 m) long and 5 1/5 inches (10.8 cm) wide at the bottom.

This invention is not to be construed as limited to the particular forms disclosed herein, since these are to be regarded as illustrative rather than restrictive. It is understood that the invention may be practiced within the scope of the claims otherwise than as specifically described.

What is claimed and desired to be protected by U.S. Letters Patent is:

1. An infant sunshade for use in an automobile with a conventional infant-supporting seat such as an infant car seat having a back supported against an automobile seatback, comprising: a flat unitary member in the shape of a flat mushroom with stem and top with an overhang portion at each side, the stem proportioned for supporting the infant sunshade by insertion downwardly between the back of an infant car seat and automobile seatback, the top proportioned for folding forwardly over the car seat back to a position of support by the car seat back, the overhang portions on each side being each a flap hingeable selectively over the top or downward to shade an infant from sunlight at the sides.

2. An infant sunshade as recited in claim 1, said infant sunshade having means for protecting an infant comprising all said overhang portions and top having an arcuate front edge free of corners that might injure an infant.

3. An infant sunshade as recited in claim 2, and further means for projecting an infant, comprising said infant sunshade being made of soft rubberlike material.

4. An infant sunshade as recited in claim 3, said soft rubberlike material permitting the overhand portions to be rolled up when there is insufficient room for hinging motion of same.

5. An infant sunshade as recited in claim 1, means for securing the overhang portion over the top comprising hook and loop material secured on a part of the top, a first overhang portion having an opening therein for leaving exposed through the opening the hook and loop material, and a second overhang portion having hook and loop material thereon in position for engaging the first said hook and loop material through said opening.

6. An infant sunshade as recited in claim 1, means for facilitating said insertion of the stem, comprising said stem being tapered in shape.

* * * * *